(12) United States Patent
Brunou et al.

(10) Patent No.: US 11,638,921 B2
(45) Date of Patent: May 2, 2023

(54) DEMOLITION DEVICE AND UTILITY MACHINE FOR DEMOLISHING A CONCRETE STRUCTURE

(71) Applicant: Savonlinnan PR-Urakointi Oy, Savonlinna (FI)

(72) Inventors: Jarkko Brunou, Savonlinna (FI); Marko Blinnikka, Ylämylly (FI)

(73) Assignee: SAVONLINNAN PR-URAKOINTI OY, Savonlinna (FI)

( * ) Notice: Subject to any disclaimer, the term of this patent is extended or adjusted under 35 U.S.C. 154(b) by 191 days.

(21) Appl. No.: 16/463,899

(22) PCT Filed: Nov. 24, 2017

(86) PCT No.: PCT/FI2017/050821
§ 371 (c)(1),
(2) Date: May 24, 2019

(87) PCT Pub. No.: WO2018/096220
PCT Pub. Date: May 31, 2018

(65) Prior Publication Data
US 2019/0283033 A1    Sep. 19, 2019

(30) Foreign Application Priority Data

Nov. 25, 2016  (FI) ...................................... 20165900

(51) Int. Cl.
*B02C 1/10* (2006.01)
*B23D 17/00* (2006.01)
(Continued)

(52) U.S. Cl.
CPC ................ *B02C 1/10* (2013.01); *B23D 17/00* (2013.01); *B23D 35/00* (2013.01); *B23D 35/002* (2013.01);
(Continued)

(58) Field of Classification Search
CPC ....... E02F 3/965; E02F 3/3681; E02F 9/2883; E04G 23/08; E04G 23/082;
(Continued)

(56) References Cited

U.S. PATENT DOCUMENTS 4,519,135 A * 5/1985 LaBounty .............. B23D 17/00
83/609
4,951,886 A * 8/1990 Berto .................... E02F 3/3681
241/101.73

(Continued)

FOREIGN PATENT DOCUMENTS

JP   2000312831 A  * 11/2000  .............. E02F 3/965
JP   2002264103 A  *  9/2002  .............. E02F 3/965
(Continued)

OTHER PUBLICATIONS

Finnish Patent and Registration Office, search report of Finnish patent application No. 20165900, dated May 31, 2017, 1 page.

*Primary Examiner* — Jonathan G Riley
(74) *Attorney, Agent, or Firm* — Thomas | Horstemeyer, LLP

(57) ABSTRACT

The application relates to a demolition device for demolishing a concrete structure according to one embodiment. The device has a crushing blade for crushing concrete, and a cutting blade for cutting metal or a pulverizing blade for grinding concrete, and a combination blade. The device can be attached to a utility machine in a detachable manner. The crushing and cutting/pulverizing blade are separate blades from each other. The combination blade is adapted to be used for crushing concrete with the crushing blade. The combination blade is adapted to be used for cutting metal with the cutting blade or for grinding concrete with the pulverizing blade. The combination blade has abutment surface parts for the crushing and cutting/pulverizing blade. The abutment surface part for the cutting/pulverizing blade (Continued)

makes possible a power transmission between the cutting/pulverizing and combination blade when using the combination blade for crushing concrete. The abutment surface part for the crushing blade makes possible a power transmission between the crushing and combination blade when using the combination blade for cutting metal or grinding concrete.

5 Claims, 3 Drawing Sheets

(51) Int. Cl.
  *B23D 35/00* (2006.01)
  *E02F 3/96* (2006.01)
  *E04G 23/08* (2006.01)
  *E02F 9/28* (2006.01)
(52) U.S. Cl.
  CPC ............ *E02F 3/965* (2013.01); *E02F 9/2883* (2013.01); *E04G 23/082* (2013.01)
(58) Field of Classification Search
  CPC .. E04G 2023/086; B23D 17/00; B23D 35/00; B23D 35/002; Y10T 225/22; Y10T 225/371; B02C 1/10
  See application file for complete search history.

(56) References Cited

U.S. PATENT DOCUMENTS

| | | | | |
|---|---|---|---|---|
| 5,438,772 | A | * | 8/1995 | Mieger ................. B23D 17/00 37/406 |
| 5,704,560 | A | * | 1/1998 | Wimmer ................. E02F 3/965 241/101.73 |
| 2006/0108462 | A1 | * | 5/2006 | Ward .................. B23D 31/008 241/101.73 |
| 2017/0190055 | A1 | * | 7/2017 | Zhao ...................... B23D 33/00 |
| 2020/0023371 | A1 | * | 1/2020 | Brunou ............... B23D 31/008 |

FOREIGN PATENT DOCUMENTS

| | | | |
|---|---|---|---|
| WO | 2015181435 A1 | 12/2015 | |
| WO | WO-2015181435 A1 | * 12/2015 | ............... B02C 1/02 |

* cited by examiner

DEMOLITION DEVICE AND UTILITY MACHINE FOR DEMOLISHING A CONCRETE STRUCTURE

PRIORITY

This application is a U.S. national application of the international application number PCT/FI2017/050821 filed on 24 Nov. 2017, which claims priority of Finnish application FI20165900 filed on Nov. 25, 2016, the contents of all of which are incorporated herein by reference.

FIELD OF THE INVENTION

The invention generally relates to demolition devices for demolishing a concrete structure.

BACKGROUND

Concrete structures usually contain for example reinforcing steel among the concrete, whereby demolishing the structures with the aid of a utility machine is difficult and requires the use of speciality tools. One such speciality tool is the concrete demolition shears 100 according to FIG. 1a-1b, which can be detachably attached to a utility machine, for example an excavator, and which can be moved and aligned with the aid of a utility machine.

Jaws 112a, 112b have been connected to the frame 110 of the concrete shears 100, which jaws comprise subsequent blades 120a, 120b meant for crushing concrete and blades 130a, 130b meant for cutting metal, which move with the same center point in relation to a central axis 160. This means that concrete to be demolished ends up between the metal cutting blades 130a, 130b, which dulls the blades.

Additionally, the opening directions of the jaws 112a, 112b are downwards or nearly straight downwards, which makes it difficult to align the concrete shears 100 with an excavator. When demolishing an edge beam of a bridge, due to the straight downwards opening jaws 112a, 112b, the excavator must work with its boom extended, whereby the center of gravity of the excavator moves closer to the equilibrium point. Having the center of gravity move close to the equilibrium point and working at the maximum reach of the machine slows down the work and makes it harder to control the movements. Additionally, the working area of a stationary excavator becomes smaller.

Additionally, it is difficult with the subsequent concrete and metal shears 120a, 120b, 130a, 130b of the concrete shears 100 to cut large metal profiles, because it is difficult to get them into the area affected by the cutting blades 130a, 130b even if the cutting force were to be sufficient for cutting the profile.

When doing the cutting work, several cutting movements have to be made, if it is at all possible to cut the profile.

Usually different jaws are available for concrete shears 100 for crushing concrete and for cutting metal. Changing the blades however takes from ten minutes to a couple of days and a blade change performed several times a day disturbs the fluency of the work and significantly lowers the work productivity.

Other demolition devices are presented in PCT publication WO 2015/181435 and U.S. Pat. Nos. 5,438,772 and 4,951,886.

SUMMARY

One object of the invention is to eliminate the above-mentioned problems of currently used concrete shears meant for demolishing reinforced concrete.

One object of the invention is achieved with a demolition device and utility machine according to the independent claims.

A demolition device according to one embodiment for demolishing a concrete structure has a crushing blade for crushing concrete, a cutting blade for cutting metal or a pulverizing blade for grinding concrete, and a combination blade. The device can be attached to the utility machine in a detachable manner. The crushing and cutting/pulverizing blade are separate blades from each other. The combination blade is fitted to be used for crushing concrete with the crushing blade. The combination blade is fitted to be used for cutting metal with the cutting blade or for grinding concrete with the pulverizing blade. The combination blade has abutment surface parts for the crushing and cutting/pulverizing blade. The abutment surface part of the cutting/pulverizing blade makes possible a power transmission between the cutting/pulverizing and combination blade when using a combination blade for crushing concrete. The abutment surface part of the crushing blade makes possible a power transmission between the crushing and combination blade when using a combination blade for cutting metal and grinding concrete.

A utility machine according to one embodiment of the invention comprises a demolition device for demolishing a concrete structure. The device has a crushing blade for crushing concrete, a cutting blade for cutting metal or a pulverizing blade for grinding concrete, and a combination blade. The device can be attached to the utility machine in a detachable manner. The crushing and cutting/pulverizing blade are separate blades from each other. The combination blade is fitted to be used for crushing concrete with the crushing blade. The combination blade is fitted to be used for cutting metal with the cutting blade or for grinding concrete with the pulverizing blade. The combination blade has abutment surface parts for the crushing and cutting/pulverizing blade. The abutment surface part of the cutting/pulverizing blade makes possible a power transmission between the cutting/pulverizing and combination blade when using a combination blade for crushing concrete. The abutment surface part of the crushing blade makes possible a power transmission between the crushing and combination blade when using a combination blade for cutting metal and grinding concrete.

Other embodiments are presented in the dependent claims.

BRIEF DESCRIPTION OF THE FIGURES

Embodiments of the invention are presented in more detail with reference to the following figures.

DETAILED DESCRIPTION OF THE FIGURES

Figure 1A:
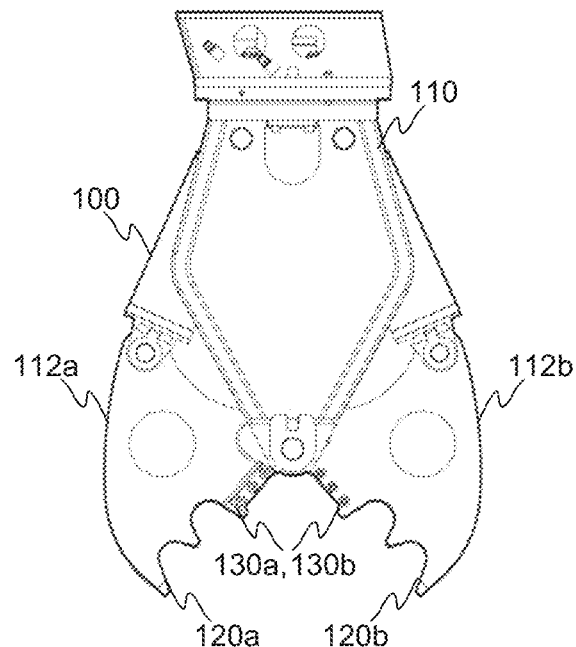
FIG. 1a-1b show concrete shears according to prior art seen from the side and the front
Figure 1B:
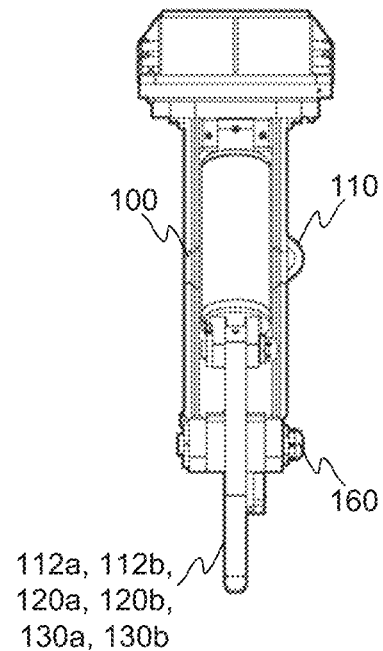

FIG. 1a-1b are described in connection with the background of the invention.

Figure 2A:
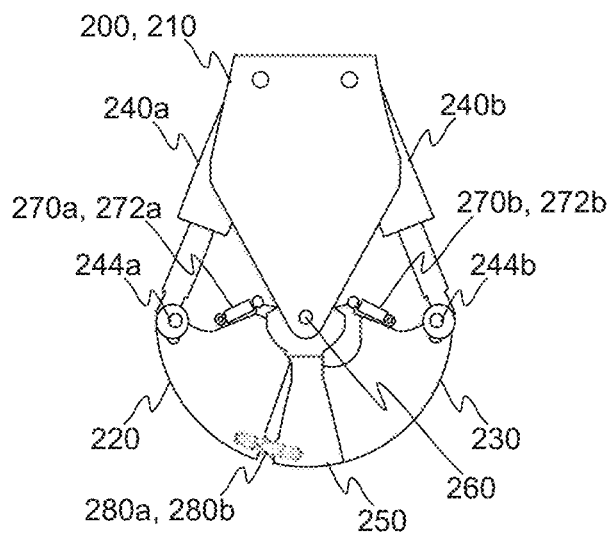
FIG. 2a-2f show a demolition device seen from different angles and the use of its combination blade
Figure 2B:
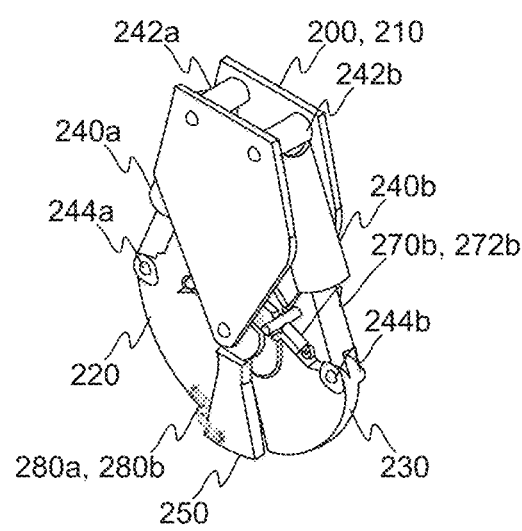

FIG. 2a-2b show straight from the side and diagonally from the side a demolition device 200 for demolishing a concrete structure, for example reinforced concrete, which demolition device can be attached to a utility machine, for example an excavator, in a detachable manner.

The device 200 comprises a separate crushing blade (crushing jaw) 220 meant for breaking and/or crushing concrete, which is equipped with a tooth 280*a* meant for breaking concrete, and a separate cutting blade (cutting jaw) 230 meant for cutting metal. The device further has as a third separate blade a combination blade (combination jaw) 250, which is equipped with a tooth 280*b* corresponding to tooth 280*a*. The combination blade 250 is used for breaking and/or crushing concrete together with a crushing blade 220 and/or for cutting metal together with a cutting blade 230.

Additionally, the device 200 comprises moving means 240*a*, 240*b* connected to the frame 210 by means of axes 242*a*, 242*b*, for example hydraulic or pneumatic cylinders, or hydraulic or electromechanical linear moving units (motors), which are connected by means of axes 244*a*, 244*b* in their ends to the crushing and cutting blades 220, 230. The means 240*a*, 240*b*, to which the utility machine user gives for example electronically or hydraulically transmittable control commands from the utility machine's cab, are fitted to move the crushing, cutting and combination blades 220, 230, 250 around the central axis 260 belonging to the frame 210.

In a utility machine according to one embodiment, which is presented in any of the above-mentioned embodiments, the device 200 meant for demolishing concrete attached to which has crushing, cutting and combination blades 220, 230, 250 fitted to move around the same center axis.

FIGS. 2*c*-2*d* and 2*e*-2*f* show from the side how the combination blade 250 of the device 200 is utilized both in crushing concrete and cutting metal.

Figure 2C:
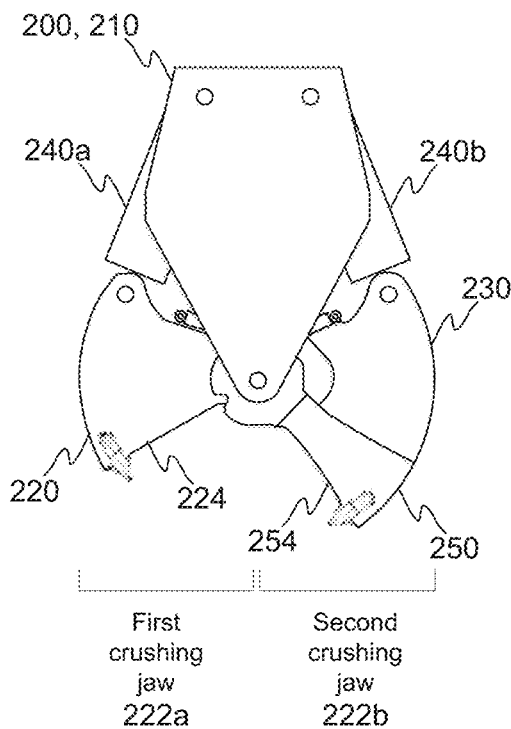

FIG. 2*c* shows how the crushing blade 220 forms a first crushing jaw 222*a*, and the combination blade 250, which is attached in connection with the cutting blade 230, and the cutting blade 230 together form a second crushing jaw 222*b*.

When in accordance to FIG. 2*c* open crushing jaws 222*a*, 222*b* are pressed together with means 240*a*, 240*b*, for example to crush a piece of concrete between the jaws 222*a*, 222*b*, the jaws 222*a*, 222*b* turn towards each other in relation to the axis 260 and simultaneously break the piece of concrete with their teeth 280*a*, 280*b* and the edges 224, 254 meant for crushing concrete, i.e. the actual blade parts. For example with a hydraulic cylinder 240*a*, 240*b* in a negative movement the piston of the cylinder 240*a*, 240*b* pushes into it and in a positive movement on the other hand the piston of the cylinder 240*a*, 240*b* pushes out of the cylinder 240*a*, 240*b*. Thus, the pressing can be realized by giving the cylinders 240*a*, 240*b* a control command, with which they perform the positive movement. Correspondingly, when it is desired to open the jaws 222*a*, 222*b* with the moving means 240*a*, 240*b*, the jaws turn away from each other in relation to the axis 260. This can be realized by giving the cylinders 240*a*, 240*b* a control command, with which they perform the negative movement.

As FIG. 2*b* shows, the movement paths of the crushing blade 220 and the cutting blade 230 in relation to the center axis 260 are fitted to run so that when pushing, i.e. pressing, the jaws 222*a*, 222*b*, the crushing and cutting blades 220, 230 move in opposite directions toward each other on the same path and the movement path of the combination blade 250 is fitted to run in the same direction as the cutting blade 230, but in an interlocking manner in relation to both the crushing blade 220 and the cutting blade 230 (so-called "cross bite"). This increases the efficiency of the press compared to jaws according to e.g. FIG. 1*a*-1*b*, which just come straight toward each other.

In a utility machine according to one embodiment, which is presented in any of the above-mentioned embodiments, the device 200 meant for demolishing concrete attached to which has crushing and cutting blades 220, 230, the movement paths of which are fitted to run towards each other in opposite directions. Additionally, the movement path of the combination blade 250 is fitted to run in an interlocking manner in relation to the movement paths of the crushing and cutting blades 220, 230.

Figure 2D:
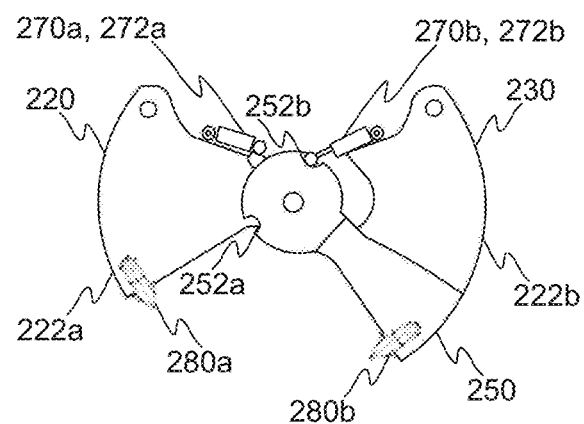

In FIG. 2*d* the frame 210 has been left out, whereby the moving and locking means 252*a*, 252*b*, 270*a*, 270*b*, 272*a*, 272*b* of the combination blade 250 belonging to the device 200 are better visible, which means are fitted to move the combination blade 250 and lock it in connection with the cutting blade 230, whereby it is possible to crush concrete with the crushing and combination blades 220, 250, i.e. the jaws 222*a*, 222*b*.

The means 252*a*, 252*b*, 270*a*, 270*b*, 272*a*, 272*b* comprise locking slots 252*a*, 252*b* in the combination blade 250, a first hydraulic or pneumatic cylinder 270*a* equipped with a cross-directional locking peg 272*a* connected to the crushing blade 220 and a second hydraulic or pneumatic cylinder 270*b* equipped with a cross-directional locking peg 272*b* easily seen in FIG. 2*b* connected to the cutting blade 230. Alternatively, the cylinders 270*a*, 270*b* can be realized also with hydraulic or electromechanical linear moving units.

The cylinders 270*a*, 270*b* are cross-linked, so when the cylinder 270*a* makes a negative movement, i.e. the piston of the cylinder 270*a* pushes into it, then the cylinder 270*b* thus makes a positive movement, i.e. the piston of the cylinder 270*b* pushes out of the cylinder, and vice versa.

When locking the combination blade 250 to the cutting blade 230 to form jaws 222*a*, 222*b*, the cylinder 270*b* is guided to make a positive movement, whereby the piston of the cylinder 270*b* pushes out and simultaneously pushes the locking peg 272*b* in the end of the cylinder 270*b* piston into the corner of the slot 252*b* of the combination blade 250, turning the combination blade 250 to attach to the cutting blade 230 in an interlocking manner and locking them together in a detachable manner, whereby a jaw 222*b* is formed and the crushing blade 220 which remains separate forms a jaw 222*a* in accordance with FIG. 2*d*. The combination blade 250 is detached from the cutting blade 230 correspondingly by guiding the cylinder 270*b* to make a negative movement, whereby its piston pushes back into the cylinder 270*b* and simultaneously lifts the locking peg 272*b* in the end of the piston out of the slot 252*b*, whereby the combination blade 250 detaches from the crushing blade 230.

Figure 2E:
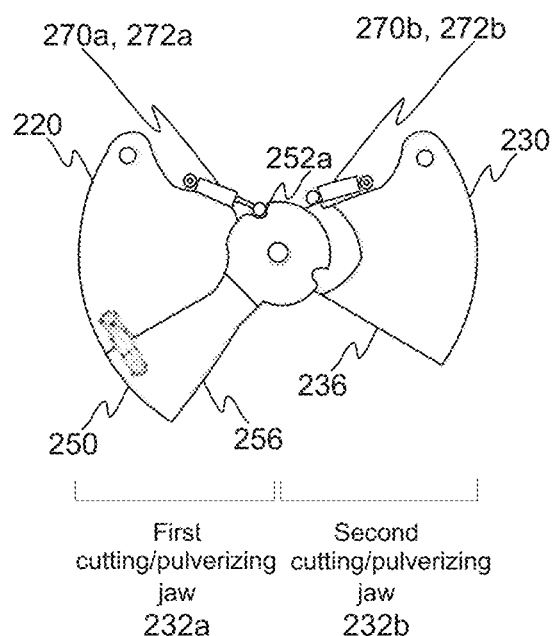

FIG. 2*e* shows how the crushing blade 220 and the thereto attached combination blade 250 form a first cutting jaw 232*a* and the cutting blade 230 forms a second cutting jaw 232*b* for cutting and/or breaking metal.

In a utility machine according to one embodiment, which is shown in one of the preceding embodiments, the device 200 meant for demolishing concrete attached to which additionally has moving and locking means 252*a*, 252*b*, 270*a*, 270*b*, 272*a*, 272*b*, which are fitted to move the combination blade 250 and lock it in connection with the cutting blade 230, whereby it is possible to crush concrete with the crushing and combination blade 220, 250, i.e. the jaws 222*a*, 222*b*. Additionally they are fitted to move the combination blade 250 and lock it in connection with the crushing blade 220, whereby it is possible to cut metal with the cutting and combination blades 230, 250, i.e. the jaws 232a, 232b.

Figure 2F:
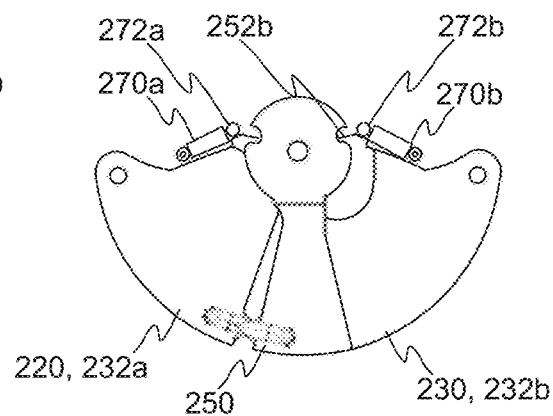

When in accordance to FIG. 2e open cutting jaws 232a, 232b are pressed together with means 240a, 240b, for example to break a piece of reinforcement steel between the jaws 232a, 232b, the jaws 232a, 232b turn toward each other in relation to the axis 260 and press the steel apart with their edges 236, 256 meant for breaking metal, i.e. the actual blade parts. FIG. 2f shows when the blades 220, 230 are pressed against each other and an unattached combination blade 250 is "loose" between them, but if it is desired to open the pressed-together jaws 232a, 232b with the means 240a, 240b, they turn away from each other in relation to the axis 260.

Because the movement path of the combination blade 250 connected to the crushing blade 220 is fitted to run in an opposite direction to and interlocked with the cutting blade 230, the force of the cutting movement is increased compared to the concrete shears 100 according to FIG. 1a-1b.

FIG. 2e-2f shows means 252a, 252b, 270a, 270b, 272a, 272b, which are fitted to move the combination blade 250 and lock it in connection with the crushing blade 220, whereby it is possible to cut metal with the cutting and combination blades 230, 250, i.e. the jaws 232a, 232b.

In FIG. 2f the pistons in both cylinders 270a, 270b are exceptionally inside them, but when locking the combination blade 250, which is not attached to other blades 220, 230, to the crushing blade 220 in order to form jaws 232a, 232b, the cylinder 270a is guided to make a positive movement. Thus, the piston of the cylinder 270a pushes out and simultaneously pushes the locking peg 272a in the end of the cylinder 270a piston into the corner of the slot 252a of the combination blade 250, turning the combination blade 250 to attach to the crushing blade 220 in an interlocking manner and locking them together in a detachable manner, whereby a jaw 232a is formed and the cutting blade 230 which remains separate forms a jaw 232b in accordance with FIG. 2e. The combination blade 250 is correspondingly detached from the crushing blade 220 by guiding the cylinder 270a to make a negative movement, whereby its piston pushes back into the cylinder 270a and simultaneously lifts the locking peg 272a in the end of the piston out of the slot 252a, whereby the combination blade 250 detaches from the crushing blade 230.

Figure 2G:
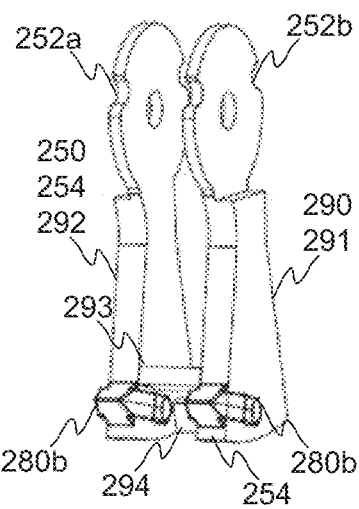
FIG. 2g-2h show a combination blade seen from different angles
Figure 2H:
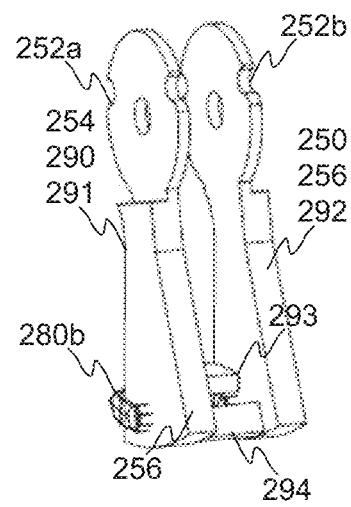

FIG. 2g-2h show an alternative combination blade 250, which can be used in the device 200 instead of the combination blade 250 presented in connection with the preceding figures.

The combination blade 250 is to its shape a U profile 290, which is formed of two blade parts 291, 292 and between them of an abutment surface part 293 for the crushing blade 220 and an abutment surface part 294 for the cutting blade 230, which can be attached in a detachable manner and which combine the blade parts 291, 292.

Both blade parts 291, 292 comprise an edge 254 equipped with a tooth 280b used for crushing and an edge 256 used for cutting.

The abutment surface 293 makes possible a power transmission between the crushing and combination blade 220, 250 when using a combination blade 250 attached to a crushing blade 220 for cutting metal together with a cutting blade 230.

The abutment surface 294 makes possible a power transmission between the cutting and combination blade 230, 250 when using a combination blade 250 attached to a cutting blade 230 for crushing concrete together with a crushing blade 220.

The abutment surfaces 293, 294 are situated at a distance from the axis 260 of the crushing and cutting blades 220, 230, so that the cutting forces caused by the transferred power remain small.

Additionally, transferring the powers to the combination blade 250 via the abutment surfaces 293, 294 reduces the endurance demands it sets on the structure.

If the power needed for the demolition is transferred to the combination blade 250 with a structure close to the axis 260, a large cutting force forms in the used support structure, which requires a massive support structure in order to endure. Additionally, the structure of the combination blade 250 must be capable of transferring power caused by the demolition work from its tip to the support structure near the axis 260, which also requires a massive and heavy combination blade 250, which is not advantageous in demolition devices.

Figure 2I:
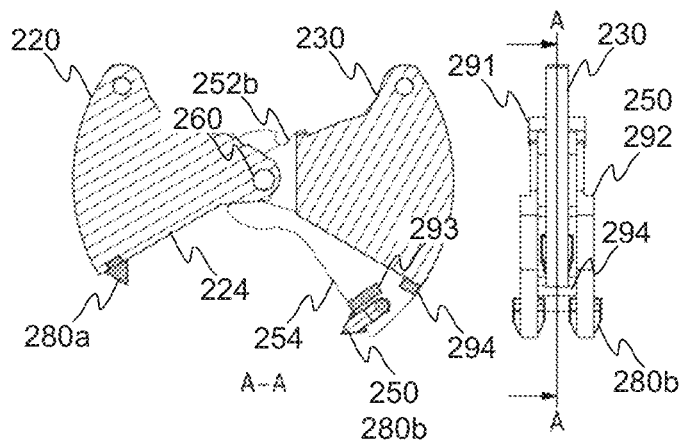
FIG. 2i-2j show the attachment and abutment surface parts of the combination blade seen from the ends of the demolition device, and as cross-sections A-A and B-B

FIG. 2i shows how in the device's 200 concrete crushing position the abutment surface 294 is supported against the edge 236 of the cutting blade 230.

The combination blade 250 attaches to the cutting blade 230 with locking means 252a, 252b, 270a, 270b, 272a, 272b when locking so that the cutting blade 230 pushes into the U profile 290 formed by the blade parts 291, 292 and the abutment surfaces 293, 294 against the abutment surface 294.

In a corresponding manner the crushing blade 220 and its edge 224 can push into the U profile 290 all the way to the abutment surface 293, when the crushing blade 220 and the blades 250, 220 attached together are pressed together.

The movement path of the crushing blade 220 is fitted to run toward (against) the cutting blade 230 and the movement path of the combination blade 250 is fitted to run so that its blade parts 291, 292 interlock in relation to the cutting blade 230 and the abutment surfaces in turn go towards the cutting blade 230.

Figure 2J:
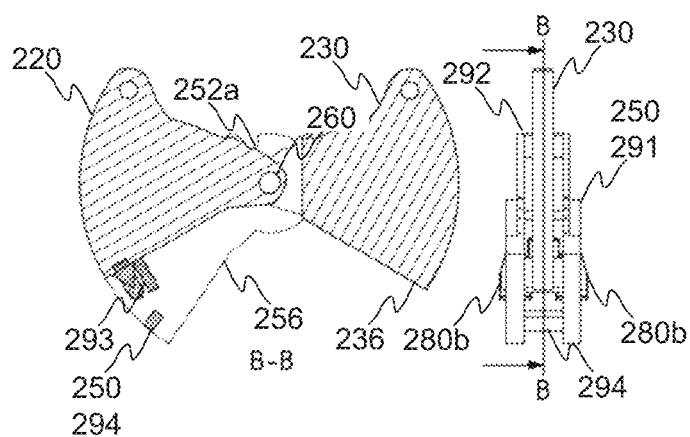

FIG. 2j shows how in the metal cutting position, the abutment surface 293 in turn is supported against the edge 224 of the crushing blade 220.

The combination blade 250 attaches to the crushing blade 220 when locking so that the crushing blade 220 pushes into the U profile 290 against the abutment surface 294.

Correspondingly, the cutting blade (further processing blade) 230 and its edge 236 can push into the U profile 290 all the way against the abutment surface 294, when the blades 220, 250 attached together and the cutting blade 230 are pressed together.

The movement path of the cutting blade 220 can in turn be toward the crushing blade 220 and the movement path of the combination blade 250 is also such that the blade parts 291, 292 interlock in relation to the crushing blade 220 and the abutment surfaces in turn go toward the crushing blade 220.

In the device 200 the crushing and cutting blade 220, 230 can as opposed to the figures be fixed, i.e. a part of the frame 210 of the device 200, so that the fixed blade is not set on an axis and does not move in relation to the frame 210. The fixed blade can for example be the cutting blade 230. Thus, the power of the device 200 is produced to the moving blade and the possibly thereto attached combination blade with the aid of a moving means 240a, for example a hydraulic cylinder.

Additionally, in the device 200 the crushing and cutting blades 220, 230 can be realized so that they move around separate axes and the combination blade 250 can be without an axis, attaching to the crushing or cutting blade 220, 230.

Additionally, in the device 200 according to FIG. 2g-2j there can instead of a cutting blade 230 be a pulverizing blade (further processing blade) meant for grinding concrete, whereby it can be used for grinding (pulverizing) crushed concrete in addition to crushing concrete.

A device 200 equipped with a pulverizing blade is otherwise the same as the device 200 shown in the preceding figures, but it has a pulverizing blade in the jaw 222b, the structure of the edge meant for pulverizing of which differs from the edge 236 of the metal blade 230, and in the same way in the combination blade 250 the structure of the edge meant for pulverizing differs from the edge 256 meant for cutting metal.

The device 200 makes possible the cutting of metal and crushing of concrete efficiently without changing jaws or concrete to be demolished ending up in the blades meant for cutting metal.

Additionally, the device 200 is well suited for example for demolishing edge beams of bridges and for demolishing other corresponding structures below an excavator. With the aid of the device 200 the working area of an excavator grows without moving the excavator and at the same time it can be used for cutting reinforcement steel, railings built of quite large steel profiles and for crushing concrete. Additionally, the balance and manoeuvrability of the excavator are improved, because the excavator can work with a shorter boom, whereto the device 200 is attached in a detachable manner.

Additionally, the above-mentioned things lead to an improvement in productivity.

The utility machine, to which the device 200 meant for demolishing a concrete structure, for example reinforced concrete, can be attached in a detachable manner, can be an excavator, which can be a rotating excavator set on a wheel or tracked chassis, a backhoe loader or a mini excavator.

The utility machine can have a boom, in the end of which there are attaching means and control connecting means, to which the device 200 can be attached in a detachable manner by means of attaching and connecting means in its frame 210.

With the aid of the connecting means of the utility machine and the device 200, the device 200 can be connected to for example the electric or hydraulic system of the utility machine, so that the device 200 and the operation of its moving means 240a, 240b can be controlled from the utility machine.

The attached and connected device 200 can turn and rotate at the end of the boom of the utility machine, and it can be guided to perform for example one of the following procedures: a pressing movement, an opening movement, a blade transfer, a blade attachment and a blade detachment.

The invention claimed is:

1. A demolishing device for demolishing a concrete structure, comprising:

a first blade for crushing concrete,
a second blade for cutting metal or grinding concrete,
a third combination blade, and
an attachment part for attaching the demolishing device to a utility machine in a detachable manner,
wherein the first blade and second blade are separate blades,
wherein the second blade comprises a cutting blade for cutting metal or a pulverizing blade for grinding concrete,
wherein the third combination blade is configured to be attached to the second blade and to be used for crushing concrete together with the first blade and the third combination blade is further configured to be attached to the first blade and to be used for cutting metal together with the second blade, when the second blade is the cutting blade, or for grinding concrete together with the second blade, when the second blade is the pulverizing blade, and
wherein a structure of the third combination blade is formed by blade parts and first and second abutment surface parts between the blade parts that combine the blade parts so that the first abutment surface part is configured to transfer power between the third combination blade and the second blade, when using the third combination blade for crushing concrete, such that the second blade is configured to be between the blade parts and the first abutment surface part for the second blade is configured to be supported against an edge of the second blade, and so that the second abutment surface part is configured to transfer power between the third combination blade and the first blade, when using the third combination blade for cutting metal or grinding concrete, such that the first blade is configured to be pushed between the blade parts and the second abutment surface part for the first blade is configured to be supported against an edge of the first blade.

2. The demolishing device according to claim 1, wherein the structure of the third combination blade is a U profile in which the first and second abutment surface parts attach the blade parts, whereupon the third combination blade is configured to be locked onto one of the first and second blades when said one of the first and second blades positions inside the U profile between the blade parts.

3. The demolishing device according to claim 2, wherein said one of the first and second blades are configured to run towards each other and away from each other and the third combination blade is locked in relation to said one of the first and second blades so that the first and second abutment surface parts are configured to go toward and away from another one of the first and second blades.

4. A utility machine, comprising the demolishing device for demolishing concrete structures according to claim 1.

5. The demolishing device according to claim 2, comprising locking slots in the third combination blade.

* * * * *